United States Patent [19]

Hajek et al.

[11] B 3,916,021
[45] Oct. 28, 1975

[54] LIQUID REDISTRIBUTOR FOR A FRACTIONATING COLUMN

[76] Inventors: James D. Hajek, Houston; Eugene J. Krizak, Baytown; Earl E. McReynolds, La Porte, all of Tex.

[22] Filed: Mar. 21, 1973

[21] Appl. No.: 343,506

[44] Published under the Trial Voluntary Protest Program on January 28, 1975 as document no. B 343,506.

[52] U.S. Cl. .................................. 261/97; 202/158
[51] Int. Cl.² ............................................ B01F 3/04
[58] Field of Search ............................. 261/94–98; 210/198 C, 456; 202/158; 55/223, 233, 386

[56] References Cited
UNITED STATES PATENTS

| | | | |
|---|---|---|---|
| 912,167 | 2/1909 | Potter .................................... | 55/223 |
| 1,032,657 | 7/1912 | Briggs ............................... | 261/98 X |
| 2,051,545 | 8/1936 | Collins ............................ | 202/158 X |
| 2,810,562 | 10/1957 | Eld et al. ......................... | 202/158 X |
| 3,006,623 | 10/1961 | Ross et al. .......................... | 261/97 X |
| 3,099,697 | 7/1963 | Lerman et al. ........................ | 261/97 |
| 3,298,673 | 1/1967 | Muto et al. ...................... | 202/158 X |
| 3,464,893 | 9/1969 | Gorodetsky ......................... | 202/158 |
| 3,695,011 | 10/1972 | Leech et al. ........................... | 55/386 |
| 3,699,748 | 10/1972 | Barkovitz .......................... | 261/96 X |

FOREIGN PATENTS OR APPLICATIONS

| | | | |
|---|---|---|---|
| 1,005,586 | 9/1965 | United Kingdom ................... | 261/96 |

*Primary Examiner*—Frank W. Lutter
*Assistant Examiner*—Richard L. Chiesa
*Attorney, Agent, or Firm*—James S. Rose

[57] ABSTRACT

The invention consists of a liquid redistribution device for use with a fractionating column to provide for the uniform redistribution of refluxing liquid in equilibrium with vapor, from a column of one diameter to a column of different diameter having a packed section. The novel redistribution device of the invention comprises a plurality of concentric frustoconical members disposed at the intersection of the columns of different diameter, and shows particularly novel advantages when operating in fractionation columns of large size, under reduced pressures, and with low liquid mass flow rates.

10 Claims, 7 Drawing Figures

(SECTION A-A)

LIQUID REDISTRIBUTOR FOR A FRACTIONATING COLUMN

BACKGROUND OF THE INVENTION

1. Field of the Invention

This invention relates to an apparatus for the uniform redistribution of refluxing liquid, in a fractionating system, from a column of one diameter to one of a different diameter containing a packed section.

2. Description of the Prior Art

Various methods for redistributing liquid condensate in fractionating columns, rectifiers, spray columns, fractionating absorbers, and the like are well known in the art. Typical examples are the trough type redistributors commercially available. These consist generally of V-shaped troughs having small drain holes in the bottom of the V to allow drainage of the condensate collected therein. Combinations of troughs can be arranged in any desired pattern. Another well known system for liquid condensate redistribution is the box type redistributor which generally consists of rectangular shaped troughs having an arrangement of V-shaped openings in the sides. When liquid condensate builds up to the bottom of the V opening, it begins to drain toward its desired destination.

Other more sophisticated designs for condensate redistribution are known in the art, see for example U.S. Pat. No. 3,464,893. Therein is described a distributing means arranged in concentric disposition to a heat exchanger within a vacuum rectifier, which provides for uniform distribution of condensate on the internal heated walls of said rectifier. There is also disclosed in the aforesaid U.S. patent a reflux distributor in concentric disposition to the heat exchanger in the form of an inverted truncated cone having a serrated bottom edge. A second cone of the same arrangement disposed just below the feed stock delivery sleeve serves as a feed stock solution distributor.

The prior art provides no means for the uniform redistribution of liquid condensate from a column of one size to an interconnected column of a different size. The trough and box type redistributors referred to hereinbefore, cannot be adapted to expand the redistributing liquid from a uniform distribution in one size column to a uniform distribution in a larger column. The distribution obtained through the use of such prior art methods is such that only the central cylindrical packed section corresponding to the diameter of the upper, smaller column is properly wetted leaving the outer annular area of packing dry of liquid and resulting in inefficient use of the packing and production of "dry-spots." Alternatively, when the unit operation is redistributing liquid from a column of larger size to a smaller one, the result is to have a disproportionately large amount of wetting in the outer annular area of packing resulting in flooding conditions in which little or no fractionation can be occurring.

The trough and box type redistributors known in the art have relatively long liquid residence times due to large liquid volume retention. This long residence time can result in plugging, material decomposition, and non-uniform liquid redistribution.

The prior art is limited to the use of single inverted conical members as redistribution devices as taught in U.S. Pat. No. 3,464,893. Also the use of a single inverted cone in any two diameter column with a smaller bottom section will cause serious liquid maldistribution problems. Liquid dropping from the cross sectional area of the upper column vertically above the lower opening of said cone will fall directly on to the packing in the lower column and thereby fully wet the packed section. The liquid dropping from the outer annular balance of the upper column cross section will fall on the single cone and drain peripherally near the wall in the bottom section to result in a disproportionately large amount of wetting and flooding. Adjustment of cone diameter or position cannot overcome the non-uniform redistribution. Alternatively, when a single non-inverted cone interconnects a column of one diameter to another of larger diameter, the central cross section of packing receives liquid flow while the packing near the wall experiences zero to low flow density with its attendant problems, such as "dry-spots," waste of packing efficiency, solids formation and plugging. Again, no adjustment of the single cone can overcome the non-uniform redistribution.

It is an object of the present invention to provide an apparatus for the uniform redistribution of refluxing liquid from a column of one diameter to one of a different diameter provided with a packed section so that uniform liquid flow density occurs throughout said packed section. The invention relates in particular to an apparatus which finds distinct advantages in redistributing liquid condensate under conditions of large column sizes, reduced pressure, and low liquid mass flow rates, with minimum residence time in the apparatus.

SUMMARY OF THE INVENTION

The invention in its broadest aspect comprises a fractionating column with two interconnecting sections of different diameter having disposed therein, at the interconnection of said sections, a liquid redistributor adapted to receive refluxing liquid from the upper part of said column and to redistribute said liquid on to the upper surface of packing disposed in the section of said column below said redistributor, wherein the improvement comprises a liquid redistributor in the form of a plurality of concentric frustoconical members of substantially equal height the common axis of said members being substantially coaxial with the vertical axis of said column and the bases of said members being coplanar and oriented towards the section of said column having the larger diameter.

DETAILED DESCRIPTION OF THE INVENTION

Figure 1:
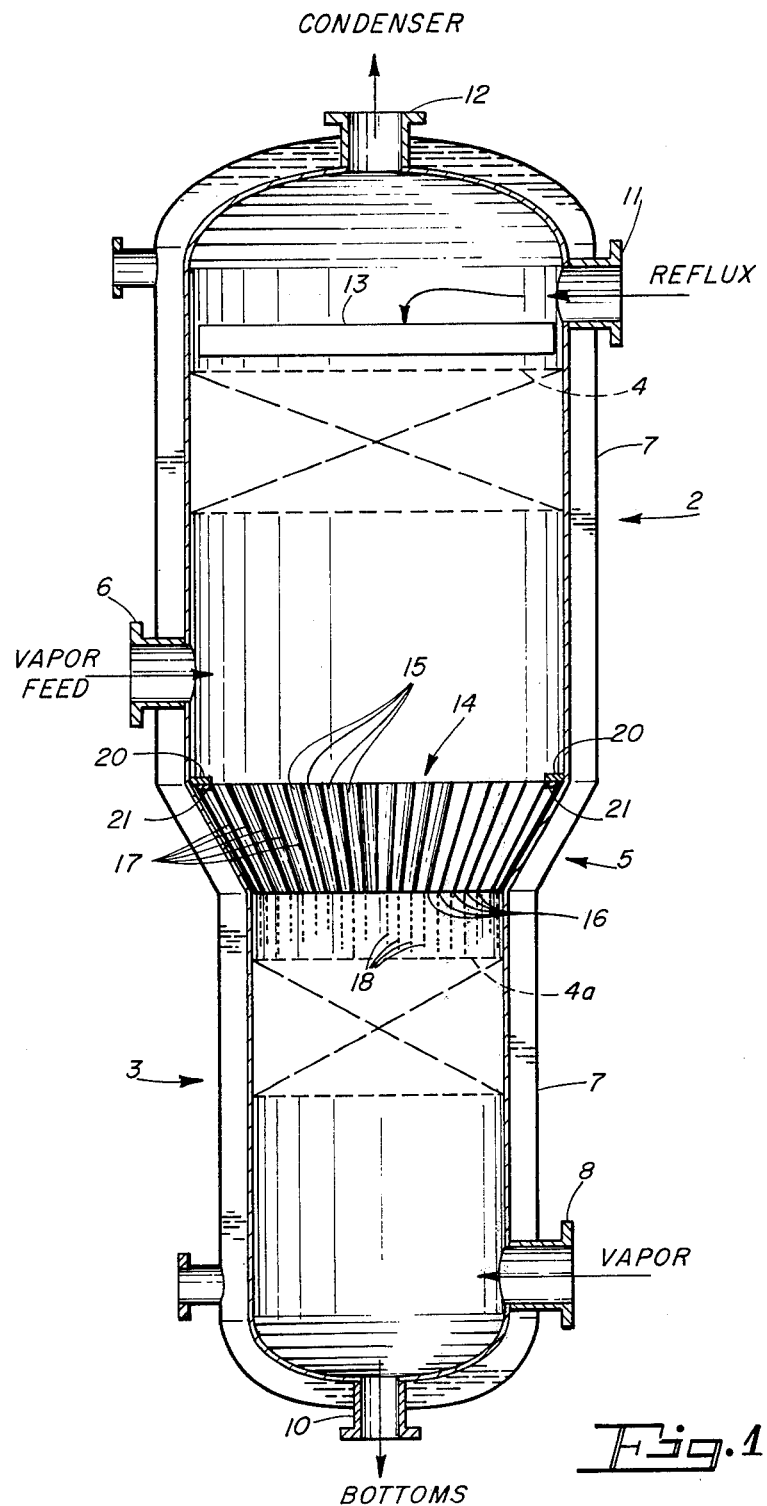
FIG. 1 is a cross-sectional view taken along the vertical axis of a specific embodiment of a fractionating column of the invention.

Fractionating columns, rectifiers, spray columns, fractionating absorbers, and the like usually are equipped with means for redistribution of condensed liquid, in a predetermined pattern, to a region of extended surface contact for revaporization. The region of extended surface contact, comprises a region packed with the materials commonly provided as packing for fractionating columns, such as Raschig rings, Lessing rings, Pall rings, cross-partition rings, single-, double- and triple spiral rings, Berl saddles, Intalox saddles, continuous wire, sponge wire, and the like.

The reason for using redistribution means in the above circumstances is to ensure uniform wetting of the packing by the draining condensate so as to achieve uniform equilibrium conditions between the descending liquid and ascending vapor which is necessary for optimum fractionation. Failure to wet the packing evenly results in unequal liquid mass flow density throughout its volume. Variations can range from completely dry areas to flooded areas, both conditions being detrimental to column functionality and, in cases of temperature-sensitive liquids, material decomposition, solids formation and plugging can occur in the low mass flow density "dry-spot" sectors. The means for redistribution as hereinbefore discussed and known in the prior art pertains to, and is limited to, columns where the redistribution is occuring in a column of uniform diameter.

The novel feature of the redistribution apparatus of the present invention resides in its ability to redistribute refluxing liquid in equilibrium with vapor from a column section of one diameter to a column section of different diameter with such uniformity that the packing in the lower column is uniformly wetted and thereby provides for the proper conditions necessary for column liquid-vapor equilibrium.

The novel liquid redistributor of the invention comprises a plurality of frustoconical members disposed at the interconnection of the column section of larger diameter with the column section of lower diameter. The frustoconical members are all of substantially the same height and are disposed within the column in such a way that their axes are all coaxial with that of the column. The frustoconical members are disposed so that the base, i.e. the wider end, of each member opens into that section of the column which has the large diameter.

Thus, if refluxing liquid is being redistributed from an upper section of smaller to a lower section of larger diameter, the frustoconical members are disposed in normal relationship; i.e. the base or wider end of each member is disposed downwardly. However, if the liquid is being distributed in the reverse manner, from an upper column section of larger to one of smaller diameter, then the frustoconical members are disposed in an inverted position at the interconnection site.

The choice of the actual number, area size, and pitch of said frustoconical members is governed only by the size and geometry of the fractionation column system being employed. Said frustoconical members gather the refluxing liquid which is flowing down the upper column. By virtue of the geometry of the members, the liquid drains from the bottom thereof in a series of circular type patterns, the number of patterns being governed by the number of frustoconical members, and uniformly wets the packing in the lower column of different diameter.

Advantageously the pitch of the frustoconical members is so chosen that refluxing liquid falling downwardly from the upper column section cannot pass through the gap between the walls of two adjoining frustoconical members without coming into contact with some part of the said walls. Obviously, falling liquid will be free to pass through the center of the innermost frustoconical member without contacting the wall thereof but this can be minimized by making the central opening small.

The periphery of the base of the outermost frustoconical member extends outwardly into the column section of larger diameter in such a way as to preclude any liquid falling freely between the outer edge of the said periphery and the inner surface of the column section. In a preferred embodiment, the interior portion of the wall of the fractionating column which forms the interconnection between the two sections of the column of different diameter has substantially the same configuration as the various frustoconical members.

In a preferred embodiment of the invention, the lower edge of each of the frustoconical members is provided with serrations or teeth which form sites from which the liquid flowing down the said members can drop or flow. The serrations can lie in the same plane as the bulk of surface of the frustoconical member to which they are attached. Alternatively, in a preferred embodiment, which will be discussed in more detail below, neighboring teeth on the lower edge of a frustoconical member can be inclined in opposite directions with respect to the vertical so that the fluid flowing down said member is divided into an inner and an outer pattern of fluid falling from the lower edge of said member.

The various frustoconical members which form the redistribution device in the improved fractionation column of the invention can be held in the desired spatial relationship one to another by an appropriate series of spacing elements which are attached by welding, bolting, clamping or like means. Similarly the redistribution device can be held in position in the column by attachment to brackets or like means located on the inner wall of the column.

As will be obvious to one skilled in the art, more than one redistribution apparatus can be disposed in a single fractionation column to redistribute refluxing liquid at a number of interconnections of differing diameters. The number is limited only by the number of interconnections within a fractionation system.

The concentric cone liquid redistribution apparatus of the invention finds particular use in columns of large diameter, from about 2 feet to about 12 feet, where this range is inclusive for the interconnecting columns of different diameter. The apparatus of the invention is particularly useful when employed with large column sizes of the above order under low absolute pressure from about 50 mm. of mercury to about 1 mm. of mercury where low liquid mass velocities, or flow rates of temperature sensitive liquids are being refluxed at high temperatures from about 250°F to about 500°F. Still another advantageous feature of the invention is the ease with which viscous condensate can be easily redistributed because of its smooth unimpeded flow down the frustoconical members.

As an additional benefit of the apparatus of the invention, the plurality of frustoconical members provides large thin-film wetted surface areas for promoting additional fractionation. Reboiled vapors can flow freely, countercurrently upward through relatively narrow concentric annular spaces in the redistributor and thereby quickly and easily reach equilibrium conditions with the descending thin liquid films.

The material of construction for the frustoconical members of the apparatus is in no way limited other than by its sensitivity to the liquid being fractionated. Materials of construction can include sheet metal, dense wire mesh, or layers thereof, plastic, and wood, or other suitable material or combination.

The use of the novel redistribution apparatus of the invention has a number of distinct advantages which can be summarized as follows:

a. It allows for uniform redistribution of refluxing liquid in equilibrium with vapor, from a column of one diameter to a column of different diameter (either larger or smaller) so as to uniformly wet the packed area in the lower column.

b. Plugging is not a problem since liquid captured from above simply flows freely downward along the unrestricted inclined surface of the frustoconical member to the section below.

c. Retention time is low for low liquid mass flow rates, which is particularly desirable in columns of large size under greatly reduced pressure and high temperatures where product decomposition is a factor.

d. The large surface area provided by multiple concentric cones serves as a large, falling film interface contact area between rising vapor and downward flowing liquid to provide added fractionation. As a result, less packing than would otherwise be required can be used in the lower column.

e. Liquid redistribution can be easily controlled according to the geometry and sizes of the columns employed, by the number, pitch, surface area, and annular area between the frustoconical members of the apparatus of the invention.

The mode of construction and operation of the fractionating column of the invention will now be further illustrated by reference to various specific embodiments.

In FIG. 1 there is shown a cross-sectional view of a fractionating column in accordance with one embodiment of the invention. In the fractionating column of FIG. 1, the upper, essentially cylindrical, column 2 of larger diameter is joined to the lower, essentially cylindrical, column 3 of smaller diameter by means of the interconnecting collar 5. The longitudinal axis of the combination is aligned essentially in a vertical plane. The combination is provided with a heating jacket 7; the source of heat therein is provided by hot fluids such as steam and the like, or by electrical heating means or any other suitable means for supplying heat under controlled conditions to overcome heat losses. The top column 2 has disposed therein a region of extended contact surface 4, commonly referred to in the art as packing. Inlet port 6 is disposed below the packed area 4 of column 2 and above the interconnection between columns 2 and 3 for the introduction of vapor feed into the combination of columns for the purpose of being fractionated therein. In the top area of column 2, there are disposed inlet port 11 to allow return of refluxing condensate to the liquid redistributor 13 and therefrom to area of packing 4 and exit port 12 from which vapors are conveyed to a means for their condensation. In the lower column 3, there are disposed a packed section 4a; a port 8 for the return of reboiled stripping vapor, and a port 10 for the removal of bottom liquid fractions therefrom.

The redistribution device 14 is fabricated from a plurality of concentrically arranged frustoconical members 17 disposed essentially in coaxial relationship to the longitudinal axis of said columns 2 and 3, and in the inverted geometric form. The redistribution device 14 is disposed essentially in the interconnection 5, whereby the widest top diameter of the frustoconical members 17 of the redistributor 14 corresponds essentially to the internal diameter of the column 2; while the widest diameter 16 of the lower liquid draining edge of the frustoconical members 17 corresponds essentially to, but is smaller than, the internal diameter of the column 3. Said redistribution device 14 is held in stationary relationship by means of peripheral holding lugs 20, disposed in permanent position on said redistribution device 14. Said lugs 20 are held in permanent position on peripheral support lugs 21 disposed on the inner circumference of column 2.

The specific embodiment of the invention exemplified by FIG. 1 sets forth a particular apparatus for redistributing liquid condensate falling from the packed section 4 of column 2, whereby the condensate is collected by the plurality of annular openings 15 (only partially numbered) disposed on top of, and formed by the projections of, said frustoconical members 17. The collected condensate flows down said frustoconical members 17 and drains off the lower edges 16 of said members to deliver a series of circular patterns of liquid rain 18 of decreasing diameter to the top of packing 4a in the narrower column 3. Boiling vapors rise from said section 4a, and pass up through the annular openings 15 to achieve equilibrium conditions with the descending condensate flowing over said frustoconical members 17.

Figure 2:
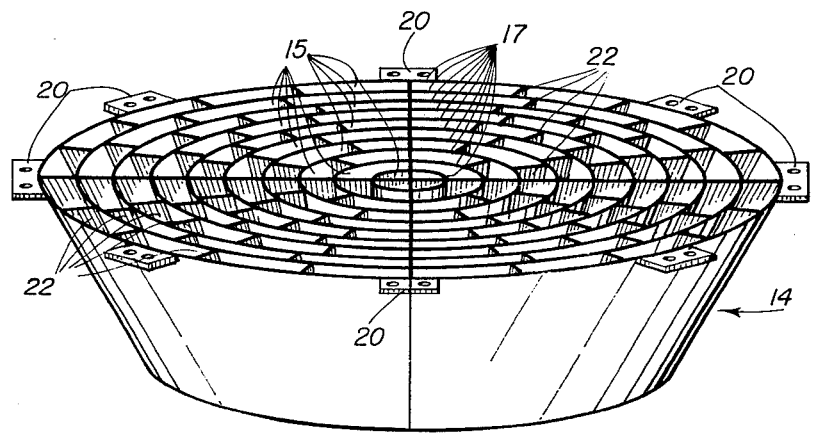
FIG. 2 is a perspective view of a specific embodiment of the redistribution apparatus of FIG. 1 but showing fewer frustoconical members for the purpose of diagram simplicity.

In FIG. 2 there is shown a perspective view of said redistribution device 14, comprising a plurality of frustoconical members 17 as set forth and described in FIG. 1 except that fewer of said frustoconical members are shown in FIG. 2 for the purpose of diagram simplicity. Also the perspective view illustrates the cone support spacers 22 (not shown in FIG. 1) disposed therein between said frustoconical members for holding said members in a predetermined spatial relationship in accordance with the annular area desired, and providing support for the plurality of cones. Said spacers 22 provide additional surface area for the establishment of equilibrium between descending liquid film and ascending vapors. Peripheral holding lugs 20 are shown disposed on the top of said redistribution apparatus.

FIGS. 1 and 2 set forth the specific embodiment of the redistribution device 14 wherein said frustoconical members are inverted for the uniform redistribution of refluxing liquid from a column of one diameter 2 to a column of smaller diameter 3.

It will be readily apparent to one skilled in the art that uniform redistribution from an upper column of smaller diameter to a lower column of larger diameter can be achieved by employing the redistribution device 14 in a non-inverted configuration, that is, in reverse relationship to that set forth in FIGS. 1 and 2. In such an embodiment the smaller diameter section of the redistribution device is the top, and acts to collect the descending liquid condensate which drains down said plurality of cones to cover an expanded area in the larger diameter column thereof.

It will be further apparent to one skilled in the art that one is not limited to a single redistribution device in a particular column combination, but as a further embodiment of the invention, more than one redistribution device can be disposed therein where required in any combination of large to small diameter column or vice versa; the only limitation being one of practical construction.

Figure 3:
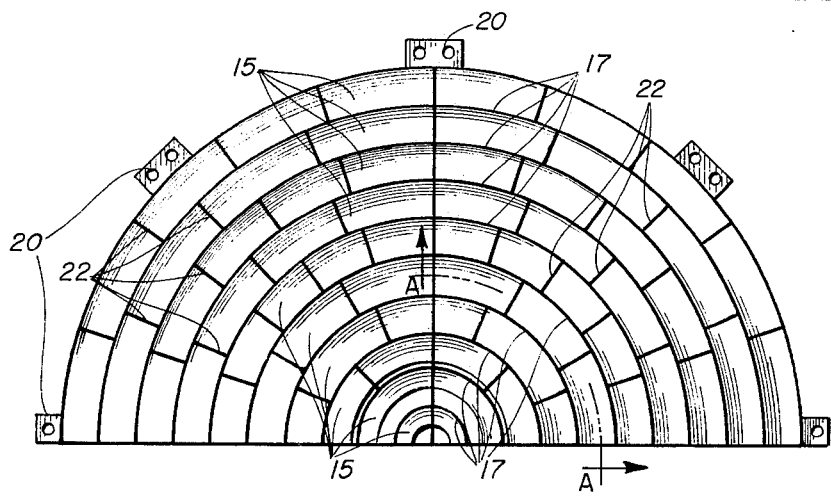
FIG. 3 is a half plan view of the redistribution apparatus of FIG. 2.
Figure 4:
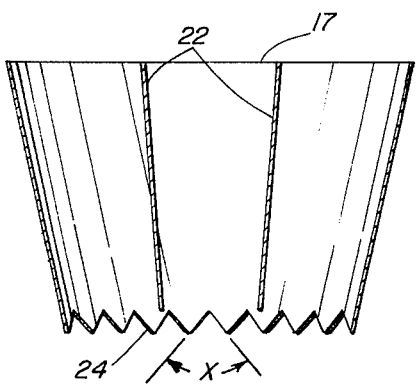
FIG. 4 is a quarter section through A—A of the preferred embodiment of FIG. 3 showing serrations on the lower draining edge.

FIG. 3 presents a half plan view of a preferred embodiment of the redistribution apparatus of the invention. FIG. 4 is a quarter section taken through the line A—A of FIG. 3 and shows an array of serrations 24 disposed on the lower, draining edge of the particular frustoconical member 17 shown in said section. Said serrations 24 are disposed on the lower, draining edges of each frustoconical member to assist in forming a uniform drainage pattern therefrom. The angle X between said serrations is advantageously from about 60° to about 120° but is preferably about 90°. The absolute size of said serrations is not critical as far as the operation of the redistribution apparatus of the invention is concerned. The choice of any particular size or angle is governed by the size of the column system (FIG. 1) in which said apparatus is functioning. When angle X in FIG. 4 is approximately 90°, retention time of draining liquid from the tips of said serrations 24, is at the minimum. However, the angle X is in no way limited to a particular value.

Figure 5:
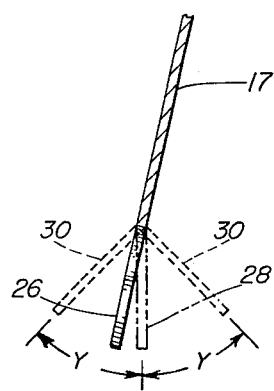
FIG. 5 is a cross-sectional view taken along the vertical axis of a single frustoconical member of the redistribution apparatus showing a particular configuration of the serrations of FIG. 4.

Said serrations 24 can be disposed in more than one spatial relationship. FIG. 5 is a cross section of a single frustoconical member 17 setting forth three illustrative conformations. The solid line 26 shows the serration disposed in the same plane of projection as the frustoconical member to which it is attached. Alternatively, the broken line position 28 shows the serration disposed in a vertical plane. In a particularly preferred embodiment the serrations are disposed in one of the positions shown as dashed lines 30.

In a most preferred embodiment neighboring serrations are positioned as shown by dashed lines 30 at alternating opposing angles one to another. Y describes the angle to the vertical made by serrations in positions 30. For close frustoconical member spacing, angle Y is limited to a value such that said serrations cannot project across the zone of said adjacent frustoconical member. The angle Y is advantageously from about 15° to about 60° but is preferably from about 30° to about 45°. In this particularly preferred embodiment of the invention, maximum and uniform distribution of liquid can be attained.

Figure 6:
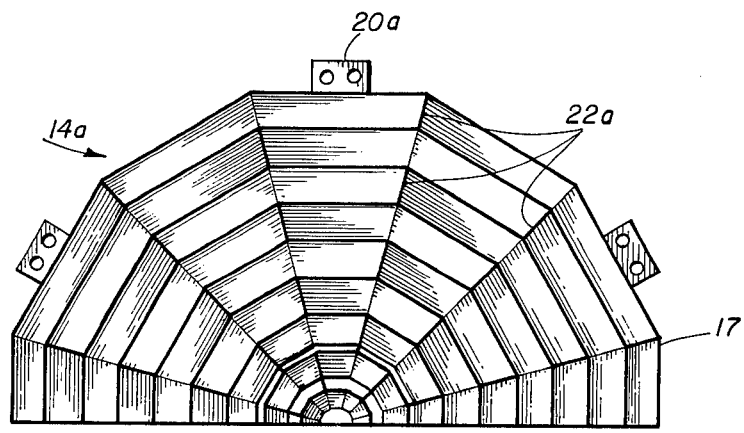
FIG. 6 is a half plan view of the redistribution apparatus of polygonal cross section.

FIG. 6 presents a half plan view of another embodiment of the redistribution apparatus 14a, where the frustoconical members are of polygonal cross section. Peripheral holding lugs 20a are shown disposed on the top of said apparatus. Support spacers 22a are disposed between said frustoconical members 17 for holding said members in a predetermined spatial relationship in accordance with the annular area desired, and providing support for the plurality of cones.

Figure 7:
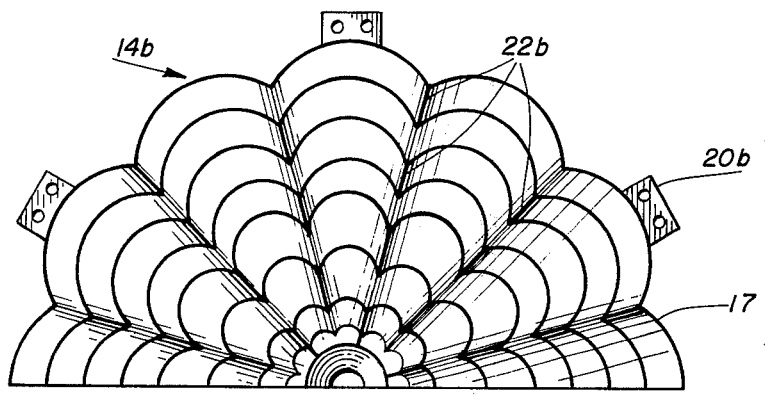
FIG. 7 is a half plan view of the redistribution apparatus of scalloped cross section.

FIG. 7 presents a half plan view of yet another embodiment of the redistribution apparatus 14b, where the frustoconical members 17 are of scalloped cross section. The lugs 20b and spacers 22b serve the same purpose as in previously described embodiments.

The novel apparatus of the invention can be employed in the fractionation of any type of liquid and finds particular value in large size columns, operating under reduced pressure and having low liquid mass flow rates of temperature-sensitive and/or viscous material.

The novel apparatus of the invention has the added advantage of simplicity of construction and ease of dismantling for cleaning and maintenance.

While the novel apparatus of the invention has been described above with reference to certain specific embodiments thereof, it is to be clearly understood that these embodiments have been presented for purposes of illustration only and are not intended to be limiting. The scope of the invention is bounded only by the scope of the claims which are set out hereinbelow.

We claim:

1. In a fractionating column with two interconnecting sections of different diameter having a liquid redistributor disposed therein at the interconnection of said sections, a reflux feed inlet positioned to feed refluxing liquid to said liquid redistributor, and a packing disposed in the section of said column below said redistributor, the improvement wherein said liquid redistributor comprises a plurality of concentric frustoconical members of substantially equal height, the common axis of said members being substantially coaxial with the vertical axis of said column and the bases of said members being coplanar and oriented towards the section of said column having the larger diameter wherein said bases open into said section, and the base of the outermost of said frustoconical members having a diameter greater than the internal diameter of said column section having the smaller diameter and positioned in such a way as to preclude any liquid falling freely between the outer peripheral edge of the outermost of said frustoconical members and the inner surface of the column section having the smaller diameter.

2. An apparatus as recited in claim 1 in which the upper section of said column has a smaller diameter than the lower section and said frustoconical members are in normal disposition.

3. An apparatus as recited in claim 1 in which the upper section of said column has a larger diameter than the lower section and said frustoconical members are inverted.

4. An apparatus as recited in claim 1 in which each of said frustoconical members has a polygonal cross section.

5. An apparatus as recited in claim 1 in which each of said frustoconical members has a scalloped cross section.

6. An apparatus as recited in claim 1 in which said frustoconical members each are of conical surface projection.

7. An apparatus as recited in claim 1 in which said frustoconical members are serrated on their lower liquid discharging edges.

8. An apparatus as recited in claim 7 in which said serrations are in the same plane of projection as said frustoconical members.

9. An apparatus as recited in claim 7 in which said serrations are disposed in a substantially vertical plane.

10. An apparatus as recited in claim 7 in which said serrations are disposed at alternating opposing angles to the vertical.

* * * * *